US011001456B2

(12) United States Patent
Hughes et al.

(10) Patent No.: US 11,001,456 B2
(45) Date of Patent: May 11, 2021

(54) CONVEYING SYSTEM FOR CONVEYABLE AND NON-CONVEYABLE ARTICLES

(71) Applicant: FedEx Ground Package System, Inc., Moon Township, PA (US)

(72) Inventors: John Hughes, South Bend, IN (US); Timothy Roney, Plymouth, IN (US)

(73) Assignee: FEDEX GROUND PACKAGE SYSTEM, INC., Moon Township, PA (US)

( * ) Notice: Subject to any disclaimer, the term of this patent is extended or adjusted under 35 U.S.C. 154(b) by 0 days.

(21) Appl. No.: 16/565,872

(22) Filed: Sep. 10, 2019

(65) Prior Publication Data

US 2020/0002102 A1  Jan. 2, 2020

Related U.S. Application Data

(63) Continuation of application No. 15/825,848, filed on Nov. 29, 2017, now Pat. No. 10,450,147.

(51) Int. Cl.
*B65G 47/68*  (2006.01)
*B65G 11/18*  (2006.01)
(Continued)

(52) U.S. Cl.
CPC .......... *B65G 47/681* (2013.01); *B65G 11/123* (2013.01); *B65G 11/183* (2013.01);
(Continued)

(58) Field of Classification Search
CPC .. B65G 47/681; B65G 11/123; B65G 11/183; B65G 11/143; B65G 67/04; B65G 2201/02
See application file for complete search history.

(56) References Cited

U.S. PATENT DOCUMENTS 5,361,889 A * 11/1994 Howell ................. B65G 47/44
   198/357
6,185,847 B1 * 2/2001 Russell .................... E02F 3/20
   198/588

(Continued)

FOREIGN PATENT DOCUMENTS

GB   1448744 A   9/1976
GB   2527078 A   12/2015

OTHER PUBLICATIONS

International Search Report and Written Opinion issued in corresponding PCT Application No. PCT/US2018/062262, dated Mar. 6, 2019 (13 pages).

*Primary Examiner* — Gene O Crawford
*Assistant Examiner* — Lester Ill Rushin
(74) *Attorney, Agent, or Firm* — Finnegan, Henderson, Farabow, Garrett & Dunner, L.L.P.

(57) ABSTRACT

A conveying system is disclosed. The conveying system may have a first conveying apparatus that conveys a first article to a first location. The conveying system may also have a second conveying apparatus that conveys a second article to a second location. The conveying system may have a frame, a chute connected to the frame, and a third conveying apparatus. The chute may convey the first article received from the first conveying apparatus to a discharge location. The third conveying apparatus, disposed below the chute, may convey the second article received from the second conveying apparatus to the discharge location. The chute may be movable relative to the to the third conveying apparatus, such that the first or second article may be selectively conveyed to the discharge location via the chute or third conveying apparatus, depending on the position of the chute relative to the third conveying apparatus.

20 Claims, 7 Drawing Sheets

(51) Int. Cl.
 *B65G 11/12* (2006.01)
 *B65G 11/14* (2006.01)
 *B65G 67/04* (2006.01)

(52) U.S. Cl.
 CPC ............ *B65G 11/143* (2013.01); *B65G 67/04* (2013.01); *B65G 2201/02* (2013.01)

(56) References Cited

U.S. PATENT DOCUMENTS

| | | |
|---|---|---|
| 6,305,277 B1 | 10/2001 | Witczak et al. |
| 6,691,853 B1* | 2/2004 | Basketfield ............ B65G 27/04 198/360 |
| 10,029,852 B1* | 7/2018 | Yang .................... B65G 11/086 |
| 2007/0190898 A1* | 8/2007 | Mercure .............. B65G 49/062 451/6 |
| 2010/0158647 A1 | 6/2010 | Lafontaine |

\* cited by examiner

CONVEYING SYSTEM FOR CONVEYABLE AND NON-CONVEYABLE ARTICLES

CROSS REFERENCE TO RELATED APPLICATIONS

This application is a continuation application of and claims the benefit of priority to U.S. patent application Ser. No. 15/825,848, filed on Nov. 29, 2017, which is hereby incorporated by reference in its entirety.

FIELD

The present disclosure relates generally to a conveying system for articles, and more particularly, to a conveying system that can convey both conveyable and non-conveyable articles from one location to another. The disclosure also relates to a chute assembly that has two conveying apparatuses, where one conveying apparatus may be selected out of the two conveying apparatuses to selectively transport an article from one location to another based on one or more characteristics of the article.

BACKGROUND

Conveying systems are often used to transport articles from one location to another, for example, in a large warehouse, distribution center, or storage area. Articles may include, for example, packages, boxes, mail items, luggage items, loaded pallets, etc. A conveying system may be used to transport one or more articles from a storage location in a warehouse to a container (such as a shipping container) or a vehicle (such as a car, truck, train, or plane), which may subsequently be used to deliver the articles to a remote location from the warehouse, for example, to a recipient's address or some intermediate point in a distribution chain. Such a conveying system often includes separate conveying mechanisms for articles of different shapes and sizes. For example, smaller articles or articles that may be light may be transported using one conveying apparatus. On the other hand, larger packages that may be heavy may be transported using a separate conveying apparatus designed to convey the larger packages to the container or vehicle.

Ultimately, the articles conveyed from a remote position in the warehouse or distribution center must be loaded and appropriately packed into the container or vehicle, for transportation to or toward the desired final recipient. One or more loading personnel usually participate in this transportation and loading process. When such personnel have to pick up the articles, particularly the larger and heavier or at least bulkier articles, the efficiency of the operation is reduced. Moreover, the personnel may become injured or disabled during the process, decreasing efficiency and morale, and increasing costs in the form of medical bills, lost productivity, and workmen's compensation.

By means of example, in conventional systems, the conveying mechanisms for the smaller and larger articles may be independent systems, positioned adjacent each other or separated from each other. Typically it is possible to position only one conveying mechanism with its discharge end near the container or vehicle. Thus, only the articles conveyed by that conveying mechanism can be delivered directly into the container or vehicle. Articles from other adjacently positioned conveying mechanisms often must be picked up by one or more persons and carried to the container or vehicle. Further, because one conveying mechanism is typically positioned at the entrance of the container or vehicle, the one or more persons must maneuver around the conveying mechanism and the edges of the container or vehicle entrance while carrying the one or more articles from the adjacent conveying mechanisms into the container or vehicle. This takes time, and increases the potential for injury, as well as damage of the articles, due to dropping.

One person may be able to pick up smaller articles from a conveying mechanism relatively easily and manually transfer and load the articles. Even then, such a process is not particularly efficient. On the other hand, one or more persons may be required to pick up the larger articles and manually carry the larger articles into the container or the vehicle and then load them into position. Improper lifting of the larger articles can often cause injury to the person or persons lifting the larger articles. The large size of the articles may also make it difficult for a person or persons to lift the articles from the conveying apparatus and to hold on to the articles as they are being carried into the container or vehicle. In some instances, this may result in the articles being dropped by the person or persons carrying the articles, which in turn may result in damage to the articles. Additionally, the need to manually lift up the larger articles and transfer them from an adjacent conveying mechanism to the enclosure or vehicle may increase a time required to complete loading of the enclosure or vehicle, delaying subsequent delivery of the articles.

The conveying system of the present disclosure presents an improvement over the prior art and solves one or more of the problems set forth above and/or other problems of the prior art.

SUMMARY

In one aspect, the present disclosure is directed to a chute assembly for conveying articles. The chute assembly may include a first conveying apparatus. The first conveying apparatus may include a chute configured to convey at least one first article from a first location to a discharge location. The discharge location may be disposed adjacent to a distal end of the first conveying apparatus. The chute assembly may also include a second conveying apparatus. The second conveying apparatus may be configured to convey at least one second article from a second location to the discharge location. The chute may be movable relative to the second conveying apparatus, such that one of the at least one first article of the at least one second article may be selectively conveyed to the discharge location via the first conveying apparatus or the second conveying apparatus, depending on the position of the chute relative to the second conveying apparatus.

In another aspect, the present disclosure is directed to another chute assembly for conveying articles to a container. The chute assembly may include a frame. The chute assembly may also include a first conveying apparatus. The first conveying apparatus may include a chute configured to convey at least one first article from a first location to a discharge location. The discharge location may be disposed adjacent to distal end of the first conveying apparatus. The chute may be pivotably connected to the frame adjacent a proximal end of the chute assembly. The chute assembly may include a second conveying apparatus. The second conveying apparatus may be configured to convey at least one second article from a second location to the discharge location. The second conveying apparatus may be disposed below the chute. The chute assembly may also include at least one actuator connected between the frame and the chute. The at least one actuator may be configured to move the chute relative to the second conveying apparatus, such that an article can be selectively conveyed to the discharge location via the first conveying apparatus or the second conveying apparatus, depending on the position of the chute relative to the second conveying apparatus.

In yet another aspect, the present disclosure is directed to a conveying system. The conveying system may include a first conveying apparatus configured to convey at least one first article to a first location. The conveying system may also include a second conveying apparatus configured to convey at least one second article to a second location. Further the conveying system may include a frame disposed adjacent the first conveying apparatus and the second conveying apparatus. The conveying system may also include a chute connected to the frame. The chute may be configured to receive the at least one first article from the first conveying apparatus. The chute may also be configured to convey the at least one first article to a discharge location. The conveying system may include a third conveying apparatus disposed below the chute. The third conveying apparatus may be configured to receive the at least one second article from the second conveying apparatus. The third conveying apparatus may also be configured to convey the at least one second article to the discharge location. The chute may be movable relative to the third conveying apparatus, such that one of the at least one first article or the at least one second article may be selectively conveyed to the discharge location via the chute or via the third conveying apparatus, depending on the position of the chute relative to the third conveying apparatus.

BRIEF DESCRIPTION OF THE DRAWINGS

The accompanying drawings, which are incorporated in and constitute a part of this disclosure, illustrate exemplary disclosed embodiments of the present disclosure and, together with the description, serve to explain the principles of the present disclosure. In the drawings.

DETAILED DESCRIPTION

Figure 1:
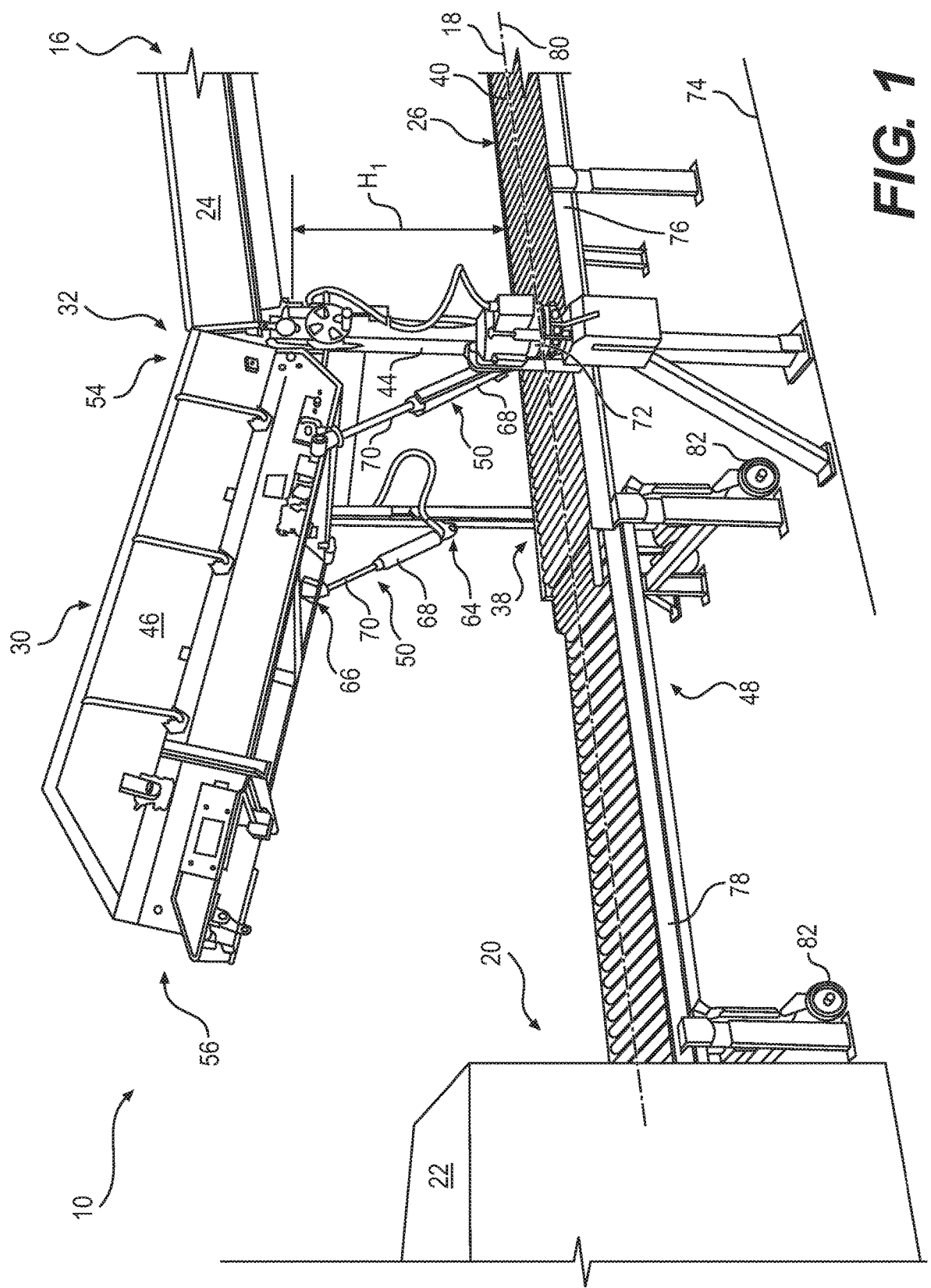
FIG. 1 is a perspective view illustrating an exemplary conveying system for conveying articles.

FIG. 1 illustrates a perspective view of an exemplary conveying system 10, which may be configured to transport (or convey) one or more articles 12 (see FIG. 2) or 14 (see FIG. 3), from storage location 16 or 18 to discharge location 20. Articles (12 or 14) conveyed by conveying system 10 may include, for example, packages, boxes, envelopes, postal or mail items, packaged goods, boxed goods, wrapped goods, or loaded pallets, by means of example only, that can be stored, for example, in a storage area, warehouse, or distribution center. The items contained in or on such articles can be a wide variety of items, such as mail, clothing, furniture, household goods, electronic products, commercial merchandise, building equipment, chemicals, building materials, and manufacturing components, by means of example only. Storage location 16 or 18 may be disposed within a storage area or warehouse (not shown) and can be remote from the enclosure into which the articles are to be loaded. Discharge location 20 may be disposed near or within an enclosure 22, which is depicted generally in the drawings and may be in the actual form of a truck, train car, ship or plane, or a shipping container that might be loaded into a ship or plane. Discharge location 20 may be a location to which one or more articles 12 and/or 14 may be conveyed for placement into, for example, the enclosure.

Articles 12 and/or 14 may have any shape or size. For example, one or more articles 12 may have dimensions such that a person may be able to lift the one or more articles 12 relatively easily and without assistance from another person. Such articles 12 may be termed conveyable articles. Conveyable articles 12 may also have weights that may be small enough for a person to pick or lift up articles 12 from conveying system 10 and to carry them to a desired location. On the other hand, one or more articles 14 may be very large and may have for example, dimensions or weights, which may make them unsuitable for lifting by one or more persons. Such articles may be termed non-conveyable articles. Conveying system 10 may be configured to transport both conveyable articles 12 and non-conveyable articles 12 from one of storage locations 16 or 18 to discharge location 20.

Enclosure 22 may be a container, a storage area in a vehicle (e.g. trunk of a car, loading space in a truck, loading space in a freight car, loading space in a plane, loading space in a shipping container, etc.), a pallet carrying one or more articles 12, and/or 14, a box containing articles 12 and/or 14, or any other type of enclosure known in the art. It is also contemplated that the one or more articles 12 and/or 14 may be stored in enclosure 22 for subsequent delivery via some method of transportation to a recipient at another location.

Figure 2:
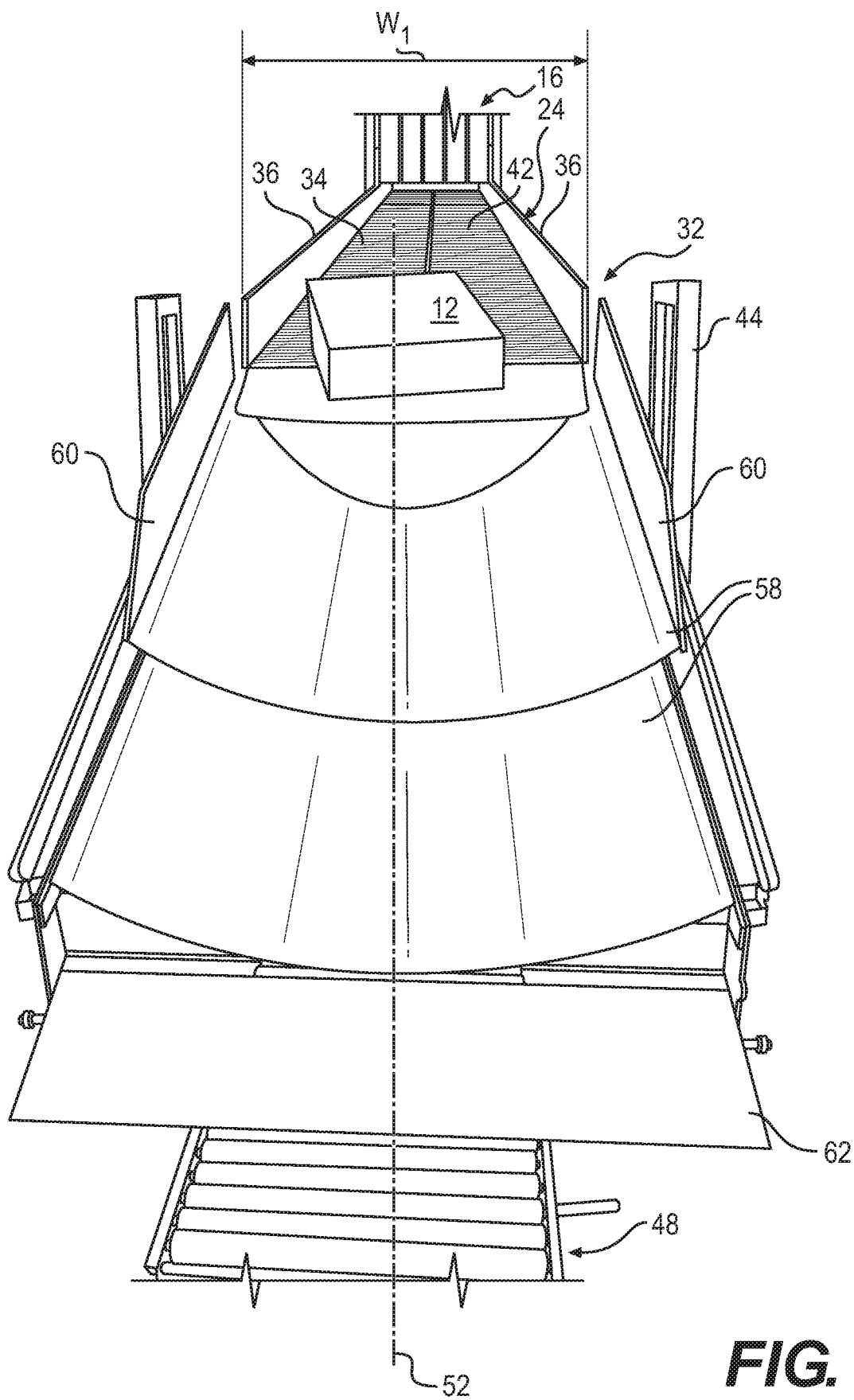
FIG. 2 is a perspective view illustrating an exemplary embodiment of a conveying apparatus for conveying a conveyable article using the conveying system of FIG. 1.

Conveying system 10 may include, for example, conveying apparatus 24 conveying apparatus 26, and chute assembly 30. FIG. 2 illustrates an exemplary embodiment of conveying apparatus 24. As illustrated in FIG. 2, conveying apparatus 24 may be configured to convey conveyable articles 12 from storage location 16 to location 32. Conveying apparatus 24 may include conveying base 34 and side walls 36. Side walls 36 may be disposed separated from each on opposite sides of conveying base 34. Conveying base 34 and side walls 36 may form a channel, which may guide conveyable articles 12 as they are transported along conveying apparatus 24. In some exemplary embodiments, side walls 36 may be configured to ensure that articles 12 do not fall out of conveying apparatus 24 as articles 12 are transported by conveying apparatus 24. It is also contemplated that some exemplary embodiments of conveying apparatus 24 may include conveying base 34 but no side walls 36. As also illustrated in the exemplary embodiment of FIG. 2, when conveying apparatus 24 is configured to convey conveyable articles 12, a width "$W_1$" between side walls 36 of conveying apparatus 24 may be larger than dimensions of conveyable article 12 but may be smaller than at least one dimension of non-conveyable article 14. Further, non-conveyable article 14 may have a size and/or a weight that may be larger than a maximum size and/or maximum weight of an article that can be conveyed by conveying apparatus 24.

Figure 3:
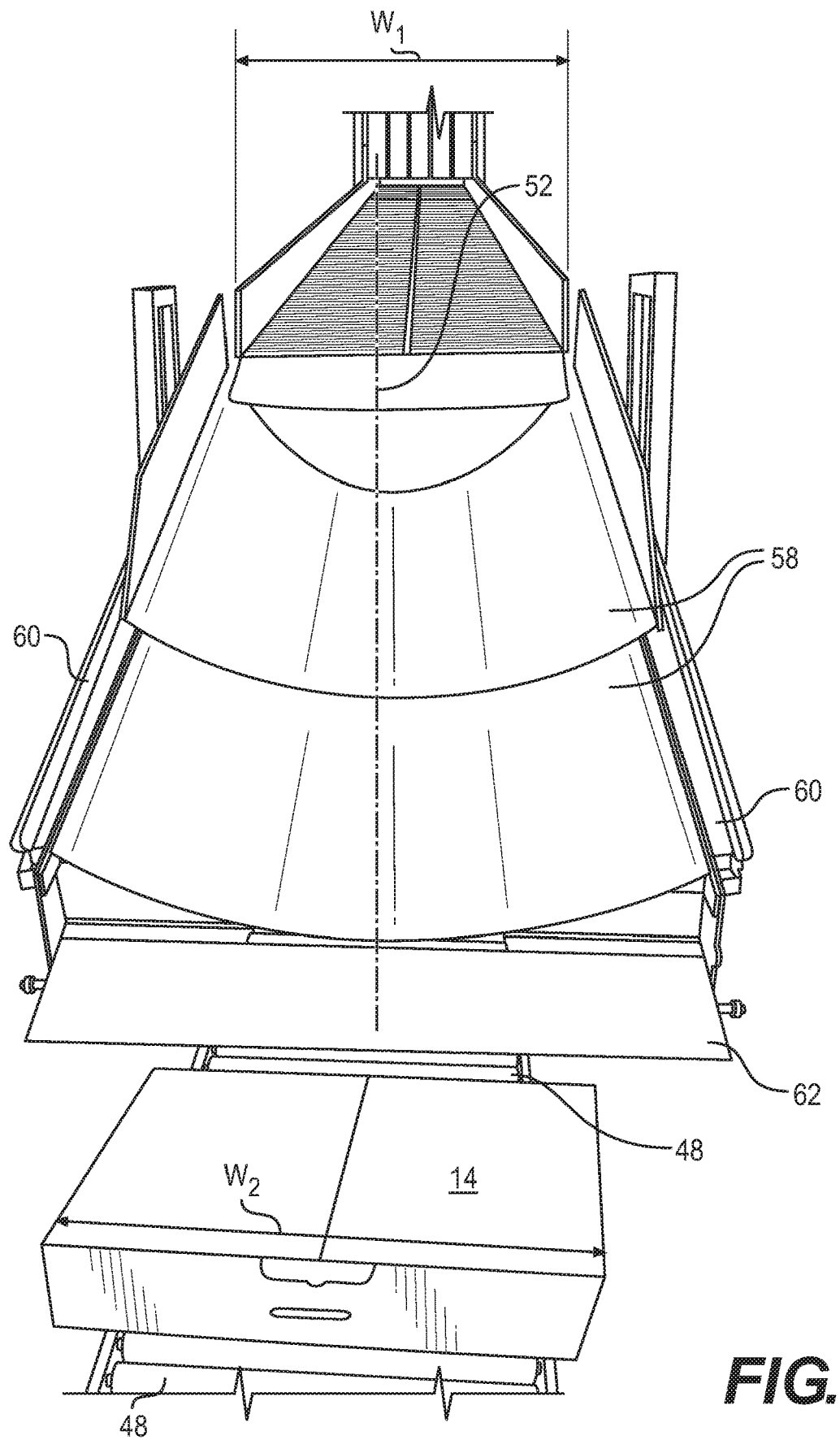
FIG. 3 is a perspective view illustrating an exemplary non-conveyable article being conveyed by the conveying system of FIG. 1.

For example, as illustrated in FIG. 3, a width $W_1$ of conveying apparatus 24 may be smaller than a width "$W_2$" of non-conveyable article 14. Further, when conveying apparatus 24 is configured to convey conveyable articles 12, conveying apparatus 24 may be capable of supporting weights of conveyable articles 12 that are less than a predetermined weight. It is contemplated that when conveying apparatus 24 is configured to convey conveyable articles 12, conveying apparatus 24 may be incapable of supporting weights of non-conveyable articles 14, which may be larger than the predetermined weight.

Returning to FIG. 1, conveying apparatus 26 may be configured to convey or transport non-conveyable articles 14 from storage location 18 to location 38. Conveying apparatus 26 may be capable of supporting the dimensions and weights of non-conveyable articles 14. Conveying apparatus 26 may include conveying base 40. It is also contemplated that in some exemplary embodiments conveying apparatus 26 may include side walls (not shown), similar to side walls 36, disposed on opposite sides of conveying base 40 to help guide non-conveyable articles 14 as they move along conveying apparatus 26.

Conveying bases 34 and 40 may have one of many different conveyor configurations. For example, conveying base 34 may be a roller bed consisting of a plurality of rollers 42 (see FIG. 2). Rollers 42 may be disposed adjacent to but separated from each other such that each roller spans width $W_1$ of conveying base 34. Rollers 42 may rotate as articles 12 travel over the one or more rollers 42. In another exemplary embodiment, conveying base 34 may include an endless conveyor belt (not shown), which may be supported by the one or more rollers 42. In yet another exemplary embodiment, conveying base 34 may include a plurality of overlapping panels (not shown), spanning width $W_1$, and connected on either side of conveying base 34 to drive chains (not shown), which in turn may be driven by one or more sprocket wheels. One of ordinary skill in the art would recognize that conveying base 34 may take the form of any other conveyor mechanism known in the art. Conveying base 40 may have a similar structure, configuration, or function as that of conveying base 34. It is further contemplated that conveying bases 34 and 40 may have the same or different conveyor configurations. Thus, for example, conveying base 34 may include a roller bed, while conveying base 40 may include an endless conveyor belt. Although only two conveying apparatuses 24 and 26 have been discussed above, it is contemplated that conveying system 10 may have any number of conveying apparatuses 24 and/or 26.

Returning to FIG. 1, chute assembly 30 may include frame 44, conveying apparatus 46, conveying apparatus 48, and one or more extendable members 50. Frame 44 may be disposed adjacent locations 32 and 38. Frame 44 may be configured to support conveying apparatus 46, which may extend from proximal end 54 to distal end 56. Proximal end 54 of conveying apparatus 46 may be disposed adjacent location 32. In one exemplary embodiment as illustrated in FIG. 1, conveying apparatus 46 may include a chute and may be configured to convey conveyable articles 12 from adjacent location 32 to adjacent discharge location 20. Conveying apparatus 46 may have a longitudinal axis 52 (see FIG. 2) disposed along a lengthwise direction (i.e. direction in which articles 12 are conveyed) of conveying apparatus 46.

As illustrated in FIGS. 2 and 3, conveying apparatus 46 may include base 58, side walls 60, and flap 62. Base 58 may allow article 12 to slide from conveying apparatus 24 to conveying apparatus 46. In one exemplary embodiment as illustrated in FIG. 2, base 58 may have a curvilinear shape. It is contemplated, however, that base 58 may have a flat shape. It is also contemplated that in some exemplary embodiments, base 58 may include a roller bed, a belt conveyor, or may have any other conveyor configuration similar to that described above with respect to conveying bases 34 and 40. Side walls 60 may be separated from each other along a width of conveying apparatus 48. A width direction of conveying apparatus 48 may be disposed generally perpendicular to longitudinal axis 52. The term generally as used in this disclosure should be interpreted to encompass typical manufacturing tolerances.

Base 58 and side walls 60 may form a channel (or chute) that may guide the one or more articles 12 as they are conveyed from location 32 towards discharge location 20 on conveying apparatus 46. Flap 62 may be pivotably connected to base 58 and may be configured to guide the one or more articles 12 exiting from conveying apparatus 46. Although conveying apparatus 46 has been described as having side walls 60 and flap 62, it is contemplated that in some exemplary embodiments, conveying apparatus 46 may not include one or both of side walls 60 and/or flap 62. As illustrated in the exemplary embodiment of FIG. 2, when conveying apparatus 46 is configured to convey conveyable articles 12, a width "$W_1$" between side walls 60 of conveying apparatus 46 may be larger than dimensions of conveyable article 12 but may be smaller than at least one dimension of non-conveyable article 14. Further, non-conveyable article 14 may have a size and/or a weight that may be larger than a maximum size and/or maximum weight of an article that can be conveyed by conveying apparatus 46.

As also illustrated in FIG. 1, conveying apparatus 46 may be disposed adjacent conveying apparatus 48. For example, conveying apparatus 46 may be disposed above conveying apparatus 48 such that conveying apparatus 46 may be vertically separated from conveying apparatus 48 by predetermined height "$H_1$" adjacent frame 44. In one exemplary embodiment, conveying apparatus 46 may be pivotably connected to frame 44 adjacent proximal end 54. Conveying apparatus 46 may be movable relative to conveying apparatus 48, from a first position proximate conveying apparatus 48 to a second position in which conveying apparatus 46 may be spaced at a predetermined distance "$H_2$" (see FIG. 4) relative to conveying apparatus 48. As shown, in this illustrated embodiment, the conveying apparatuses 48 and 46 are generally aligned with each other along their respective longitudinal axes. While in the illustration show, apparatus 46 is made to transport conveyable articles and apparatus 48 is made to transport larger and/or heavier non-conveyable articles, the system of the present invention can be reversed, so that non-conveyable articles are transported on the top apparatus and conveyable articles are transported on the bottom apparatus.

One or more extendable members 50 may be connected between frame 44 and conveying apparatus 46. Extendable member 50 may extend from first end 64 to second end 66. First end 64 of extendable member 50 may be pivotally connected to frame 44. In one exemplary embodiment as illustrated in FIG. 1, first end 64 may be connected to frame 44 at a location disposed between conveying apparatus 46 and conveying apparatus 48. It is contemplated, however, that first end 64 of extendable member 50 may be connected to frame 44 at a location disposed above both conveying apparatus 46 and conveying apparatus 48. Second end 66 of extendable member 50 may be connected to conveying apparatus 46 between proximal end 54 and distal end 56 of conveying apparatus 46. In one exemplary embodiment, second end 66 of extendable member 50 may be connected to base 58 of conveying apparatus 46.

A length of extendable member 50 may be adjustable, allowing distal end 56 of conveying apparatus 46 to be raised or lowered relative to conveying apparatus 48 by pivotably moving conveying apparatus 48 about frame 44. In some exemplary embodiments, extendable member 50 may be a single-acting or double-actuating actuator. For example, actuator 50 may include body 68, a piston (not shown) disposed within body 68, and piston rod 70 connected to the piston and configured to slidably move within body 68. A fluid medium may be disposed on one or both sides of the piston within body 68. Transferring fluid into or removing fluid from body 68 may cause piston rod 70 to slidably move within body 68, thereby raising or lowering distal end 56 of conveying apparatus 46 relative to conveying apparatus 48. Although two actuators 50 have been illustrated in FIG. 1, it is contemplated that chute assembly 30 may include any number of actuators 50.

Chute assembly 30 may include pump 72 and one or more valve arrangements (not shown) that may allow fluid to be transferred into or out of body 68 of actuator 50. Pump 72 may be mounted on frame 44, although other mounting locations (e.g. floor 74) are also contemplated. In one exemplary embodiment, actuator 50 may be a hydraulic actuator. In this embodiment, pump 72 may be configured to pump hydraulic fluid from a tank (not shown) into body 68 of actuator 50, causing piston rod 70 to extend outward from body 68. A valve arrangement (not shown) may be used to allow hydraulic fluid to drain from actuator 50 to a hydraulic fluid sump (not shown), causing piston rod 70 to retract into body 68, when desired. In another exemplary embodiment, actuator 50 may be a pneumatic actuator. In this embodiment, pump 72 may be a compressor configured to direct compressed air into body 68 of actuator 50, causing piston rod 70 to extend outward from body 68. A valve arrangement (not shown) may be used to allow air to escape from body 68, causing piston rod 70 to retract into body 68, when desired.

In one exemplary embodiment as illustrated in FIG. 1, actuator 50 may be configured to raise distal end 56 of conveying apparatus 46 relative to conveying apparatus 48 by extending piston rod 70 outwards from body 68. In this embodiment, actuator 50 may be configured to lower distal end 56 of conveying apparatus 46 relative to conveying apparatus 48 by retracting piston rod 70 into body 68. In another exemplary embodiment, where first end 64 of actuator 50 may be disposed above conveying apparatus 46, actuator 50 may be configured to raise distal end 56 of conveying apparatus 46 relative to conveying apparatus 48 by retracting piston rod 70 into body 68. In this embodiment, actuator 50 may be configured to lower distal end 56 of conveying apparatus 46 relative to conveying apparatus 48 by extending piston rod 70 outward from body 68.

It is also contemplated that in some exemplary embodiments, chute assembly 30 may include other mechanisms known in the art, different from actuator 50, for raising or lowering distal end 56 of conveying apparatus 46 relative to conveying apparatus 48. For example, chute assembly 30 may include a rack and pinion arrangement for pivotably rotating conveying apparatus 46 relative to frame 44 and conveying apparatus 48. By way of another example, chute assembly 30 may include a rope-and-pulley, or chain-and-sprocket arrangement to raise or lower distal end 56 of conveying apparatus 46 relative to conveying apparatus 48. Chute assembly 30 may be equipped with safety mechanisms (not shown) known in the art that may prevent conveying apparatus 46 from moving relative to conveying apparatus 48 in case of failure of pump 72, extendable members 50, or any of the other mechanisms for pivoting conveying apparatus 46 discussed above.

While the invention contemplates the use of any mechanisms and systems that can efficiently and safely move the chute from a down position to an up position (permitting articles to be conveyed on the bottom conveying apparatus proximate the opening of the enclosure, or into the enclosure, in the preferred embodiment, a "one-touch" system is preferred. Through "one-touch" of the an operator, the electronic controls and related components will automatically orient the chute from one position (up or down) to the other, making it easy for the operator to place the system in a ready position to transfer and load articles on the selected conveyor apparatus.

Figure 4:
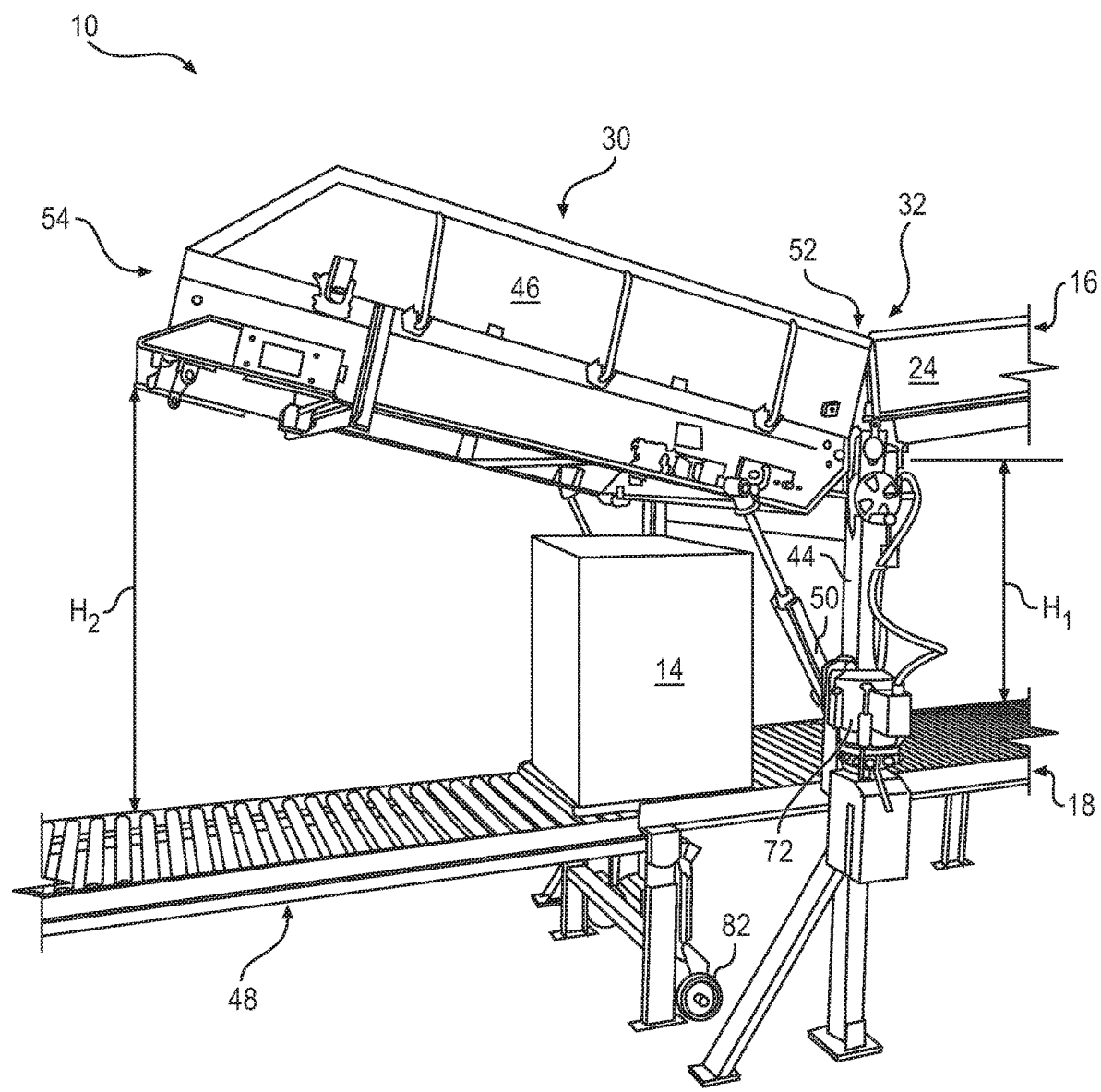
FIG. 4 is another perspective view illustrating an exemplary non-conveyable article being conveyed by the conveying system of FIG. 1.

FIG. 4 illustrates an exemplary configuration of chute assembly 30, wherein distal end 56 of conveying apparatus 46 has been raised to predetermined height "$H_2$" above second conveying apparatus 48. It is contemplated that predetermined height $H_2$ may be equal to or greater than predetermined height $H_1$. As illustrated in FIG. 4, predetermined heights $H_1$ and $H_2$ may be selected such that non-conveyable article 14 may be conveyed on conveying apparatus 48 without touching conveying apparatus 46. Non-conveyable article 14 may not be conveyable via conveying apparatus 46 but may be conveyable via conveying apparatus 48.

Returning to FIG. 1, conveying apparatus 48 may extend at least from adjacent proximal end 54 of conveying apparatus 46 to adjacent distal end 56 of conveying apparatus 46. Conveying apparatus 48 may have a longitudinal axis 80 disposed along a lengthwise direction of conveying apparatus 48. Longitudinal axis 80 of conveying apparatus 48 may be generally aligned with longitudinal axis 52 of conveying apparatus 46 in a direction along which articles 12 and/or 14 may be conveyed by chute assembly 30. Conveying apparatus 48 may include first conveying portion 76 and second conveying portion 78. First conveying portion 76 may extend rearward from adjacent frame 44. In one exemplary embodiment, first conveying portion 76 may extend from adjacent frame 44 to adjacent storage location 18. First conveying portion 76 may be configured to receive one or more non-conveyable articles 14 from conveying apparatus 26 and to convey the one or more articles 14 to location 38 adjacent frame 44. In one exemplary embodiment as illustrated in FIG. 1, first conveying portion 76 may be fixedly attached to frame 44 and/or to floor 74.

Second conveying portion 78 of conveying apparatus 48 may extend from adjacent frame 44 toward discharge location 20. Second conveying portion 78 may receive one or more non-conveyable articles 14 from first conveying portion 76 adjacent location 38 and convey the one or more articles 14 from location 38 to discharge location 20. Second conveying portion 78 may be movable relative to first conveying portion 76. In one exemplary embodiment as illustrated in FIG. 1, second conveying portion 78 may be slidably movable relative to first conveying portion 76 along longitudinal axis 80 of conveying apparatus 48. For example, as illustrated in FIG. 1, second conveying portion 78 may be equipped with wheels 82 that may allow second conveying portion 78 to slidably move relative to first conveying portion 76 along longitudinal axis 80.

In one exemplary embodiment as illustrated in FIG. 1, first conveying portion 76 may be disposed above second conveying portion 78 relative to floor 74. Thus, for example, second conveying portion 78 may have a retracted configuration in which second conveying portion 78 may be moved and located under first conveying portion 76. In the retracted configuration, second conveying portion 78 may extend rearward from adjacent frame 44 toward storage location 18. Second conveying portion 78 may also have an extended configuration in which second conveying portion 78 may extend forward from adjacent frame 44 towards discharge location 20.

It is contemplated that in some exemplary embodiments, second conveying portion may be disposed above first conveying portion 76. It is further contemplated that in yet other exemplary embodiments, second conveying portion 78 may be disposed adjacent first conveying portion 76 and may be rotated laterally (i.e. sideways) into position so that the second conveying portion 78 may convey one or more articles 14 from first conveying portion 76 to discharge location 20.

In some exemplary embodiments, first and/or second conveying portions 76 and 78 may be roller beds. In other exemplary embodiments, first and/or second conveying portions 76 and 78 may have any of the conveyor configurations similar to those discussed above with respect to conveying bases 34 and 40. It is contemplated that first and second conveying portions 76 and 78 may have the same or different conveyor configurations. For example, first conveying portion 76 may be a roller bed and second conveying portion 78 may include an endless conveyor belt, or vice-versa.

Figure 5:
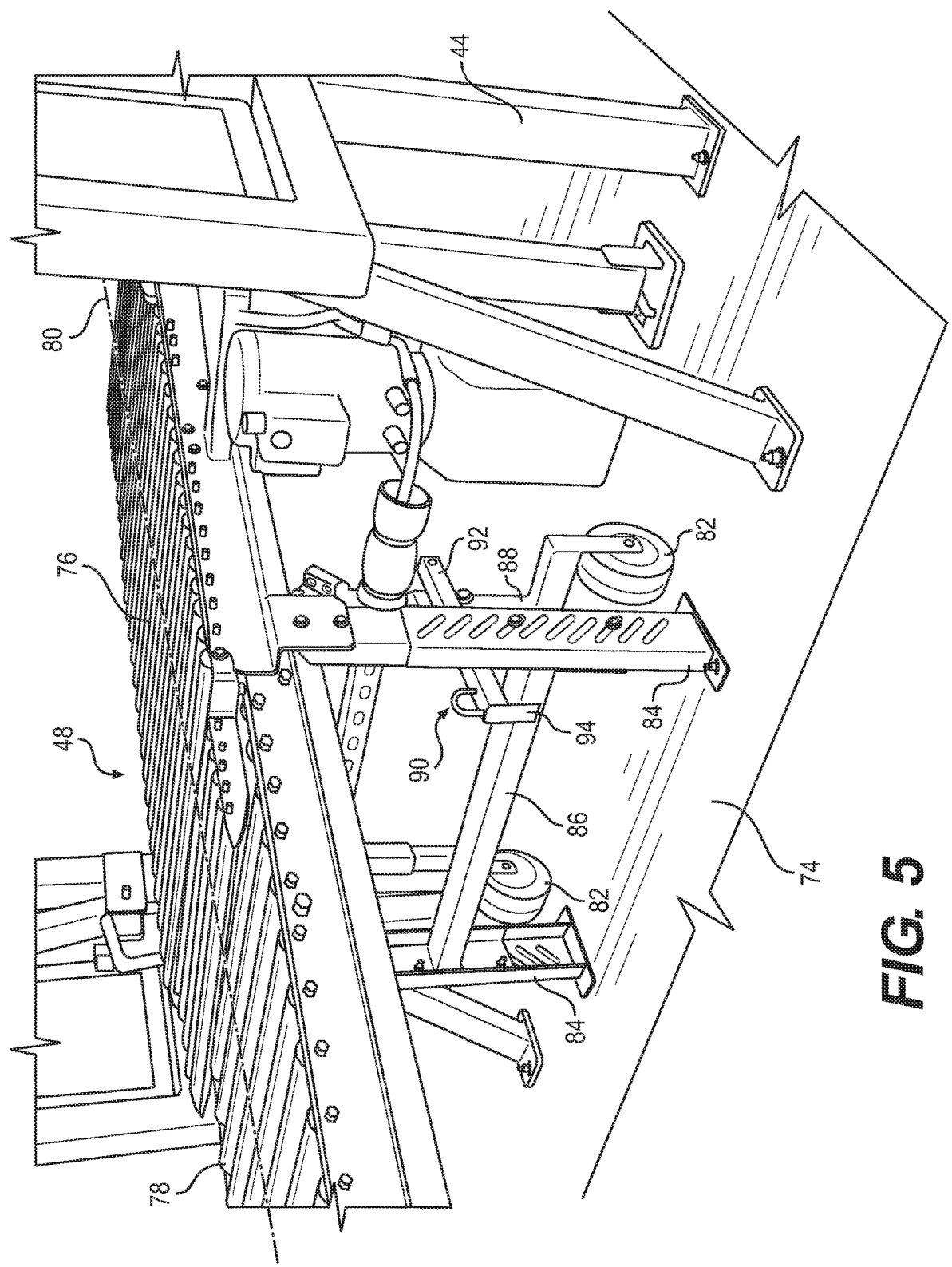
FIG. 5 is a magnified perspective view of an exemplary conveying apparatus for conveying non-conveyable articles using the conveying system of FIG. 1.

FIG. 5 illustrates an exemplary magnified perspective view of conveying apparatus 48 adjacent frame 44. As illustrated in FIG. 5, first conveying portion 76 of conveying apparatus 48 may include legs 84 disposed separated from each other on opposite sides of first conveying portion 76 along a width direction of first conveying apparatus 48. The width direction of first conveying apparatus 48 may be generally perpendicular to longitudinal axis 80. Legs 84 may project from first conveying portion 76 towards floor 74 and may rest on floor 74. In some exemplary embodiments, legs 84 may be fixedly attached to floor 74. Crossbar 86 may extend between legs 84. Second conveying portion 78 may include wheel assembly 88, which may project from second conveying portion 78 toward floor 74. Wheel assembly 88 may include one or more wheels 82 that may support wheel assembly 88 on floor 74.

Second conveying portion 78 may include bracket 90, which may be connected to wheel assembly 88. In one exemplary embodiment as illustrated in FIG. 5, bracket 90 may be pivotably connected to wheel assembly 88. It is contemplated, however, that in other exemplary embodiments, bracket 90 may be slidingly or removably connected to wheel assembly 88. In one exemplary embodiment, bracket 90 may be an L-shaped bracket, including bar 92 and end projection 94. Bar 92 may be pivotably or removably connected at one end to wheel assembly 88. End projection 94 may project from an opposite end of bar 92. End projection 94 may be configured to engage with crossbar 86 of first conveying portion 76, thereby preventing movement of wheel assembly 88 along longitudinal axis 80. Thus, bracket 90 may prevent relative movement between first and second conveying portions 76 and 78 of conveying apparatus 48 when the second conveying portion 78 is in its extended configuration.

Figure 6A:
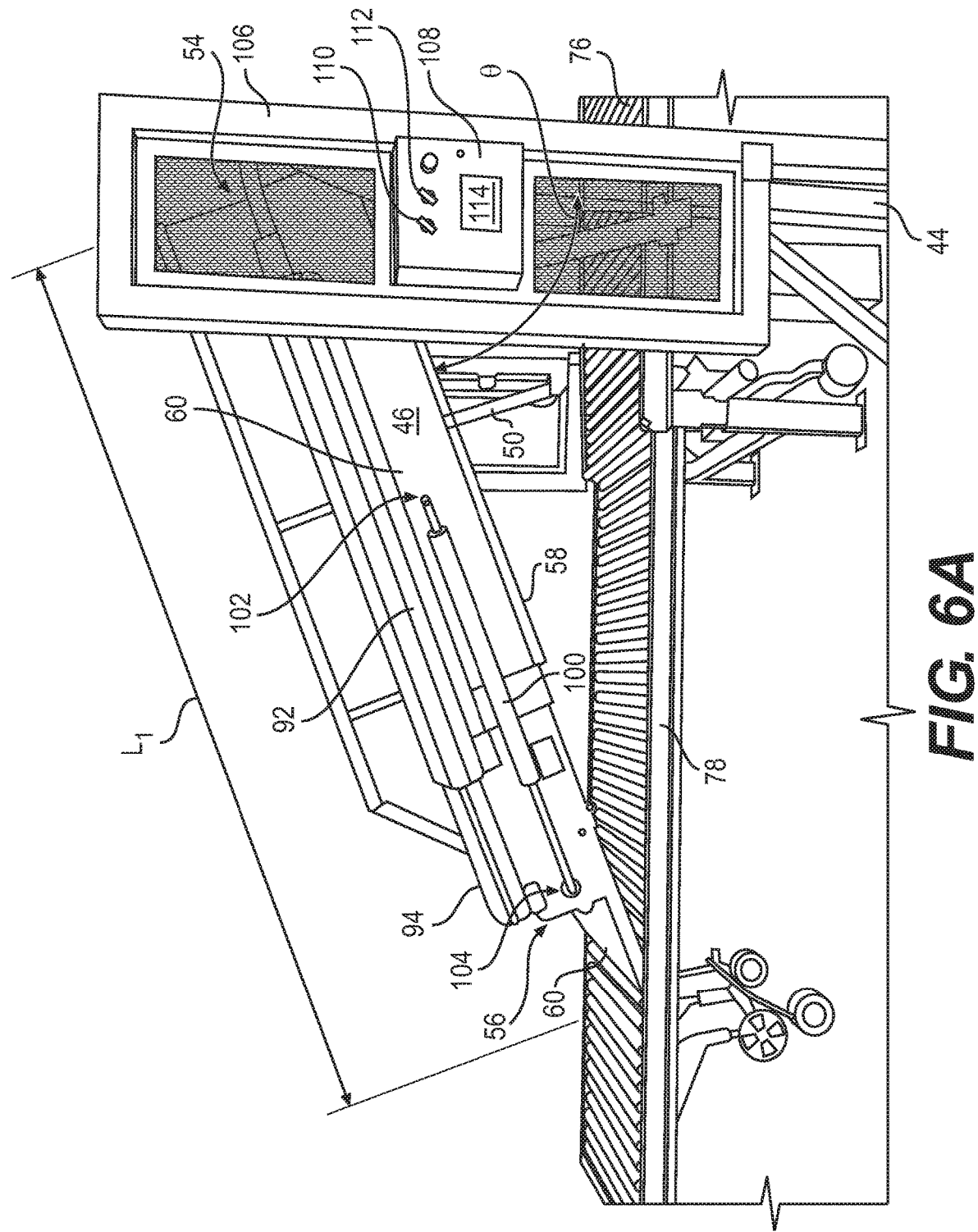
FIG. 6A is an exemplary configuration of the conveying system of FIG. 1.

FIG. 6A illustrates an exemplary configuration of chute assembly 30. As illustrated in FIG. 6A, distal end 56 of conveying apparatus 46 may be positioned to rest on second conveying portion 78 of conveying apparatus 48. As illustrated in FIG. 6A, conveying apparatus 46 may include fixed portion 96 and movable portion 98. Movable portion 98 may be slidingly movable relative to fixed portion 96 of conveying apparatus 46. Conveying Apparatus 46 may also include extendable member 100, which may extend from first end 102 to second end 104. First end 102 of extendable member 100 may be attached to fixed portion 96 of conveying apparatus 46. Second end 104 of extendable member 100 may be attached to movable portion 98 of conveying apparatus 46. A length of conveying apparatus 46 may be adjusted by adjusting a length of extendable member 100. Conveying apparatus 46 may have a first predetermined length "$L_1$" in the configuration of FIG. 6A.

In one exemplary embodiment, extendable member 100 may be an actuator. Actuator 100 may be a hydraulic actuator or a pneumatic actuator. Actuator 100 may have a structure and function similar to that of actuators 50. At least one of a hydraulic fluid or air may be supplied to actuator 100 by pump 72. In some exemplary embodiments, a pump (not shown) different from pump 72 may be used to supply either hydraulic fluid or air to actuator 100 depending on whether actuator 100 is a hydraulic actuator or a pneumatic actuator. Although only one actuator 100 is illustrated in FIG. 6A, it is contemplated that conveying apparatus 46 may have any number of actuators 100. For example, in one embodiment, conveying apparatus 46 may include a pair of actuators 100 disposed on side walls 60 of conveying apparatus. It is also contemplated that in some exemplary embodiments, the one or more actuators 100 may be disposed under base 58 of conveying apparatus 46 instead of being disposed on side walls 60.

Figure 6B:
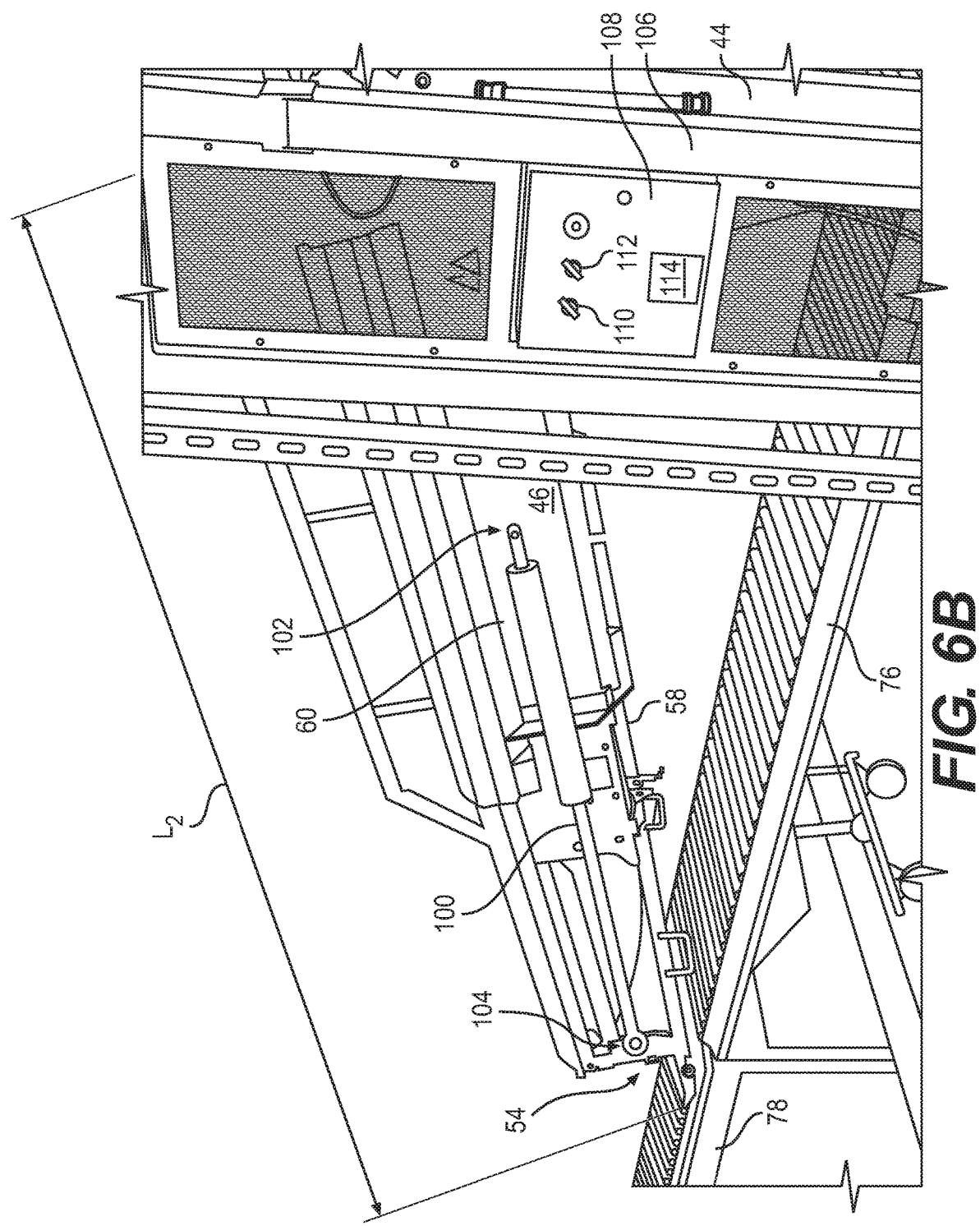
FIG. 6B is another exemplary configuration of the conveying system of FIG. 1.

FIG. 6B illustrates another exemplary configuration of chute assembly 30. As illustrated in FIG. 6B, actuator 100 may be extended to increase a length of conveying apparatus 46 from the first predetermined length "$L_1$" (see FIG. 6A) to a second predetermined length "$L_2$." Adjusting a length of actuator 100 may allow a length of conveying apparatus 46 to be adjusted between first predetermined length $L_1$ and second predetermined length $L_2$. Extending the length of conveying apparatus 46 may allow conveying apparatus 46 to deliver articles 12 nearer to discharge location 20. Extending the length of conveying apparatus 46 may also help reduce angle "θ" between conveying apparatus 46 and frame 44. Reducing an inclination of conveying apparatus 46 by reducing angle θ in this manner may help prevent relatively taller articles 12 on conveying apparatus 46 from tumbling down conveying apparatus 46.

As illustrated in FIGS. 6A and 6B, chute assembly 30 may include side panel 106 and control box 108. Side panel 106 may be mounted on frame 44. Control box 108 may be mounted on side panel 106. It is contemplated, however, that control box 108 may be mounted directly on frame 44 or may be mounted at another location away from chute assembly 30. Control box 108 may include one or more selectors 110 and 112, and controller 114. In one exemplary embodiment, selector 110 may be associated with one or more actuators 50 and selector 112 may be associated with one or more actuators 100.

Selector 110 may have one of three positions, a first position associated with extending actuator 50, a second position associated with retracting actuator 50, and a third neutral position in which a length of actuator 50 may not change. Likewise, selector 112 may have one of three positions, a first position associated with extending actuator 100, a second position associated with retracting actuator 100, and a third neutral position in which a length of actuator 100 may not change. Although only two selectors 110 and 112 have been illustrated in FIGS. 6A and 6B, it is contemplated that chute assembly 30 may include any number of selectors. For example, each actuator 50 and 100 may be associated with a separate selector 110 or 112, respectively. In other exemplary embodiments, a single selector 110 or 112 may control the extension or retraction of all actuators 50 and all actuators 100, respectively.

Controller 114 may be configured to control operations of actuators 50 and 100 based on signals received from selectors 110 and 112. Controller 114 may embody a single microprocessor or multiple microprocessors, digital signal processors (DSPs), etc. Numerous commercially available microprocessors may be configured to perform the functions of controller 114. Various other known circuits may be associated with controller 114, including power supply circuitry, signal-conditioning circuitry, and communication circuitry.

In response to signals received from selector 110, for example, controller 114 may be configured to adjust one or more valve arrangements (not shown) to allow fluid (hydraulic fluid or air) to flow into or out of actuators 50, thereby causing an extension or retraction of actuators 50. Extension or retraction of actuators 50 may in turn allow adjustment of a height of distal end 56 above conveying apparatus 48. Likewise, in response to signals received from selector 112, for example, controller 114 may be configured to adjust one or more valve arrangements (not shown) to allow fluid (hydraulic fluid or air) to flow into or out of actuators 100, thereby causing an extension or retraction of actuators 100. Extension or retraction of actuators 100 may in turn allow adjustment of a length of conveying apparatus 46

During operation of conveying system 10, when it is desirable to convey conveyable articles 12 to discharge location 20, selector 112 may be moved into, for example, its first position. In response, controller 114 may cause actuators 100 to extend so that a length of conveying apparatus 46 may be adjusted between first predetermined length $L_1$ and second predetermined length $L_2$. Further, selector 110 may be moved into, for example, its second position causing retraction of actuators 50, which in turn may cause distal end 56 of conveying apparatus 46 to be lowered relative to conveying apparatus 48 so that flap 62 may rest on second conveying portion 78 of conveying apparatus 48. One or more conveyable articles 12 may be conveyed from storage location 16 to location 32 via conveying apparatus 24. Conveying apparatus 46 may receive the one or more articles 12 from conveying apparatus 24 adjacent location 32. The one or more articles 12 may then be conveyed by conveying apparatus 46 from location 32 to adjacent distal end 56 of conveying apparatus 46. The one or more articles 12 may be transferred from flap 62 onto second conveying portion 78 of conveying apparatus 48, which may convey the one or more articles 12 to enclosure 22. In some exemplary embodiments, conveying apparatus 46 may directly convey articles 12 to enclosure 22 without first conveying articles 12 to second conveying portion 78 of conveying apparatus 48.

Further, during operation of conveying system 10, when it is desirable to convey non-conveyable articles 14 to discharge location 20, selector 110 may be moved into, for example, its second position causing distal end 56 of conveying apparatus 46 to be raised by a predetermined height $H_2$ relative to conveying apparatus 48. One or more non-conveyable articles 14 may be conveyed from storage location 18 to location 38 via conveying apparatus 26. Conveying apparatus 48 may receive the one or more articles 14 from conveying apparatus 26 adjacent location 38 and may convey articles 14 from location 38 to discharge location 20 or into enclosure 22. Thus, conveying apparatus 46 may be movable relative to conveying apparatus 48 such that one of article 12 or article 14 can be selectively conveyed to discharge location 20 via one of conveying apparatus 46 or conveying apparatus 48, depending on a position of the chute of conveying apparatus 46 relative to conveying apparatus 48

Although conveying apparatus 24 and conveying apparatus 46 have been described as conveying conveyable articles 12 in the above description, it is contemplated that in some exemplary embodiments, conveying apparatus 24 and conveying apparatus 46 may additionally or alternatively be capable of conveying non-conveyable articles 14. Further, although conveying apparatus 26 and conveying apparatus 48 have been described as conveying non-conveyable articles 14 in the above description, it is contemplated that in some exemplary embodiments, conveying apparatus 26 and conveying apparatus 48 may additionally or alternatively be capable of conveying conveyable articles 12.

The conveying system 10 disclosed herein may allow both conveyable articles 12 and non-conveyable articles 14 to be conveyed from their respective storage locations 16 and 18 to discharge location 20 and/or into enclosure 22, without the need for a person to pick up and carry heavy and/or large non-conveyable articles 14, for example beside, over, or around a mechanism or system for conveying conveyable articles, and thereby transport of load them into an enclosure 22, such as a truck or train car or shipping container. Both the non-conveyable articles and the conveyable articles can be moved from its original remote position within a warehouse or distribution center to the discharge location 20 and/or into enclosure 22, by mechanical conveying systems alone, without the loading persons having to physically pick up and transport the articles.

With the disclosed invention, one or more loading personnel can with the system load an enclosure with both conveyable and non-conveyable articles, in whatever sequence and manner that loads the enclosure most efficiently and safely. With a single touch, the chute system can be oriented to convey either conveyable or non-conveyable articles to the enclosure. The person(s) operating the system can load all of the non-conveyables first, and then load the smaller conveyable articles; or load all of the conveyable articles first followed by all non-conveyable articles, or load some of one type, followed by some of the others, in any sequence that leads to the most efficient and best use of space. Both the conveyables and non-conveyables can be directly and readily conveyed into the enclosure, since both the conveying apparatus for the conveyable articles and the conveying apparatus for the non-conveyable apparatus are generally aligned with each other. When the chute is placed in the up position, the articles on the lower conveying apparatus can be transported on or by the lower conveying apparatus into the enclosure. When the chute is placed in the down position, the articles on the upper conveying apparatus can be transported on or by upper conveying apparatus into the enclosure.

By allowing delivery of the non-conveyable articles 14 directly to discharge location 20 and/or into enclosure 22 in this manner, conveying system 10 will help reduce or prevent injuries to persons responsible for transferring non-conveyable articles 14 into enclosure 22. Additionally, conveying system 10 may help reduce an amount of time required to convey both conveyable and non-conveyable articles 12 and 14, respectively from their respective storage locations 16 and 18 into enclosure 22, which in turn may help prevent delays in subsequent delivery of articles 12 and/or 14. The present invention thus provides multiple benefits, including the reduction of injuries and the related costs (that can otherwise lead to losses of millions of dollars), the improvement of employee morale and productivity, and increased efficiency and related higher profits and speedier loading and delivery of the conveyable and non-conveyable articles.

It will be apparent to those skilled in the art that various modifications and variations can be made to the disclosed conveying system. Other embodiments will be apparent to those skilled in the art from consideration of the specification and practice of the disclosed conveying system. It is intended that the specification and examples be considered as exemplary only, with a true scope being indicated by the following claims and their equivalents.

What is claimed is:

1. A chute assembly for conveying articles, the chute assembly comprising:
    a frame;
    a first conveying apparatus including a chute pivotably connected to the frame adjacent a proximal end of the chute and configured to convey at least one first article to a discharge location disposed adjacent a distal end of the chute;
    a second conveying apparatus configured to convey at least one second article to the discharge location, wherein the chute is disposed above the second conveying apparatus and the distal end of the chute is movable from a first position proximate the second conveying apparatus to a second position spaced at least a predetermined distance above the second conveying apparatus, such that one of the at least one first article or the at least one second article can be selectively conveyed to the discharge location via the first conveying apparatus or the second conveying apparatus, depending on a position of the chute relative to the second conveying apparatus; and
    a safety mechanism configured to prevent movement of the chute from the second position.

2. The chute assembly of claim 1, wherein the chute is configured to be raised relative to the second conveying apparatus adjacent the distal end.

3. The chute assembly of claim 2, further including:
    a frame configured to support the chute adjacent a proximal end of the first conveying apparatus; and
    at least one extendable member connected between the frame and the chute.

4. The chute assembly of claim 3, wherein the extendable member is a hydraulic actuator.

5. The chute assembly of claim 4, further including a pump configured to supply hydraulic fluid to the hydraulic actuator.

6. The chute assembly of claim 5, wherein the safety mechanism is configured to prevent movement of the chute relative to the conveying apparatus upon failure of the pump.

7. The chute assembly of claim 3, wherein
    one end of the extendable member is attached to the frame, and
    the safety mechanism is disposed between an opposite end of the extendable member and the frame.

8. The chute assembly of claim 7, wherein the one end is disposed above the chute.

9. The chute assembly of claim 7, wherein the one end is disposed below the chute.

10. A chute assembly for conveying articles, the chute assembly comprising:
    a first conveying apparatus including a chute pivotable about a proximal end of the chute and configured to convey at least one first article to a discharge location disposed adjacent a distal end of the chute;
    a second conveying apparatus configured to convey at least one second article from a second location to the discharge location, wherein
        the chute is disposed above the second conveying apparatus and the distal end of the chute is movable from a first position proximate the second conveying apparatus to a second position spaced at least a predetermined distance above the second conveying apparatus, such that one of the at least one first article or the at least one second article can be selectively conveyed to the discharge location via the first conveying apparatus or the second conveying apparatus, depending on a position of the chute relative to the second conveying apparatus, and
        the chute is configurable to be fixed in place while in the second position.

11. The chute assembly of claim 10, further including an adjustable member configured to move the chute from a first position proximate the conveying apparatus to a second position disposed above the conveying apparatus.

12. The chute assembly of claim 11, wherein the adjustable member is a hydraulic actuator.

13. The chute assembly of claim 12, further including a pump configured to supply hydraulic fluid to the hydraulic actuator.

14. The chute assembly of claim 13, further including a safety mechanism configured to fix the chute in place in the second position.

15. A conveying system, comprising:
    a frame;
    a first conveying apparatus positioned adjacent the frame, the first conveying apparatus configured to convey a first article to a discharge location;
    a second conveying apparatus movably connected to the frame and positioned above the first conveying apparatus, the second conveying apparatus configured to convey a second article to a distal end disposed adjacent the discharge location;
    wherein the distal end of the second conveying apparatus is movable from a first position proximate the first conveying apparatus to a second position above the first conveying apparatus.

16. The conveying system of claim 15, further including an actuator configured to move the second conveying apparatus.

17. The conveying system of claim 16, wherein the actuator is a pneumatic actuator.

18. The conveying system of claim 16, wherein one end of the actuator is connected to the frame and an opposite end of the actuator is connected to the second conveying apparatus.

19. The conveying system of claim 18, wherein the actuator includes a safety mechanism configured to prevent movement of the second conveying apparatus relative to the first conveying apparatus.

20. The conveying system of claim 15, wherein the second conveying apparatus is connected to the frame at a predetermined distance above the first conveying apparatus.

* * * * *